(12) United States Patent
Park et al.

(10) Patent No.: US 11,443,507 B2
(45) Date of Patent: Sep. 13, 2022

(54) ELECTRONIC DEVICE FOR IDENTIFYING EXTERNAL OBJECT AND OPERATING METHOD THEREOF

(71) Applicant: Samsung Electronics Co., Ltd., Suwon-si (KR)

(72) Inventors: Sangmin Park, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/011,246

(22) Filed: Sep. 3, 2020

(65) Prior Publication Data
US 2021/0073538 A1 Mar. 11, 2021

(30) Foreign Application Priority Data
Sep. 5, 2019 (KR) .......................... 10-2019-0110089

(51) Int. Cl.
*G06V 20/00* (2022.01)
*G06K 9/62* (2022.01)
(52) U.S. Cl.
CPC .......... *G06V 20/00* (2022.01); *G06K 9/6256* (2013.01); *G06K 9/6267* (2013.01)
(58) Field of Classification Search
CPC ............. G06K 9/6267; G06K 2209/27; G06K 9/6256; G06K 9/00624; G06K 9/6273; G06Q 20/208
See application file for complete search history.

(56) References Cited

U.S. PATENT DOCUMENTS

| 9,801,517 B2 | 10/2017 | High et al. |
| 10,178,291 B2 | 1/2019 | Wexler et al. |
| 10,192,087 B2 | 1/2019 | Davis et al. |
| 2012/0087592 A1 | 4/2012 | Kim et al. |
| 2016/0026861 A1 | 1/2016 | Cervin et al. |

(Continued)

FOREIGN PATENT DOCUMENTS

| JP | 2017-531261 A | 10/2017 |
| KR | 10-1960899 B1 | 3/2019 |
| WO | 2019/013711 A1 | 1/2019 |

OTHER PUBLICATIONS

Naver Blog; Face Recognition; One-shot learning; https://blog.naver.com/infoefficien/221252489520; Aug. 14, 2018.

(Continued)

*Primary Examiner* — Pinalben Patel
(74) *Attorney, Agent, or Firm* — Jefferson IP Law, LLP

(57) ABSTRACT

An electronic device for identifying an external object, based on related information and a method of operating the same are provided. The electronic device includes a memory configured to store an object list and object image learning data, and at least one processor. The at least one processor may be configured to acquire an image including a specific object, update the object list, based on user purchase history information, collect image data relating to the object, based on the updated object list to update the object image learning data, learn an object classification model, based on the updated object list and the updated object image learning data, and identify the specific object by the learned object classification model.

20 Claims, 9 Drawing Sheets

(56) References Cited

U.S. PATENT DOCUMENTS

| | | | |
|---|---|---|---|
| 2016/0092732 A1* | 3/2016 | Black | G06K 9/6201 |
| | | | 382/103 |
| 2016/0260135 A1 | 9/2016 | Zomet et al. | |
| 2018/0189841 A1* | 7/2018 | Lee | G06Q 30/0255 |
| 2018/0260799 A1 | 9/2018 | Doerr | |
| 2018/0330196 A1 | 11/2018 | Chaubard et al. | |
| 2019/0042079 A1* | 2/2019 | Choi | G06F 16/532 |
| 2020/0074242 A1* | 3/2020 | Chen | G06Q 30/0601 |
| 2021/0390430 A1* | 12/2021 | Aristizabal | G06N 5/04 |

OTHER PUBLICATIONS

Naver Blog; [Next to B] PyTorch's Siamese Network and One Shot Learning; https://blog.naver.com/nextobe/221053021197; Jul. 17, 2017.

Koo; AI Research Topic/Deep Learning [Deep Learning] pre-training and fine-tuning; Enough is not enough; https://eehoeskrap.tistory.com/186; Aug. 17, 2017.

Kekoxtutorial; Keras for Everyone KEKOxTutorial; Design a powerful image classification model with a small dataset; https://keraskorea.github.io/posts/2018-10-24-little_data_powerful_model/; Oct. 24, 2018.

Active Learning; Active Learning; https://goodtogreate.tistory.com/entry/Active-Learning; Aug. 19, 2015.

Zhang et al.; Active Learning from Weak and Strong Labelers; arXiv:1510.02847v2 [cs.LG]; Oct. 19, 2015; San Diego, CA.

Batmaz et al.; "A Review on Deep Learning for Recommender Systems: Challenges and Remedies"; Artificial Intelligence Review; CrossMark; Springer Nature B.V.; XP055557419; Aug. 29, 2018; pp. 1-37.

International Search Report with Written Opinion dated Dec. 18, 2020; International Appln No. PCT/KR2020/011884.

European Search Report dated Jan. 25, 2021; European Appln. No. 20194335.4-1207.

* cited by examiner

ELECTRONIC DEVICE FOR IDENTIFYING EXTERNAL OBJECT AND OPERATING METHOD THEREOF

CROSS-REFERENCE TO RELATED APPLICATION(S)

This application is based on and claims priority under 35 U.S.C. § 119 of a Korean patent application number 10-2019-0110089, filed on Sep. 5, 2019, in the Korean Intellectual Property Office, the disclosure of which is incorporated by reference herein in its entirety.

BACKGROUND

1. Field

The disclosure relates to an electronic device for recognizing an external object, based on related information and an operating method thereof.

2. Description of Related Art

As information and communication technologies and semiconductor technologies have developed, electronic devices have been developed into multi-functional devices that provide various services according to spaces and objects user-centrically. For example, the electronic devices may provide various services such as a product purchase and management service, a control and management service for various external electronic devices, and a user-specific information provision and management service, based on a wireless communication service.

Recently, as a vision system for providing a function of recognizing an object included in an image acquired through a camera has been developed, an electronic device is utilized in more various fields by using this function. For example, the electronic device may recognize an object, based on an image acquired through a camera, and provide various services related to the identified object.

The above information is presented as background information only to assist with an understanding of the disclosure. No determination has been made, and no assertion is made, as to whether any of the above might be applicable as prior art with regard to the disclosure.

SUMMARY

Generally, in the object recognition function, objects are detected and recognized using only the object information included in the image, but there is a limitation in recognition accuracy and recognizable object types, and a method of increasing recognition accuracy for various objects is required.

Aspects of the disclosure are to address at least the above-mentioned problems and/or disadvantages and to provide at least the advantages described below. Accordingly, an aspect of the disclosure is to provide an electronic device and an operation method thereof to improve recognition accuracy of an external object by utilizing various related information.

Additional aspects will be set forth in part in the description which follows and, in part, will be apparent from the description, or may be learned by practice of the presented embodiments.

In accordance with an aspect of the disclosure, an electronic device is provided. The electronic device includes a memory configured to store an object list and object image learning data, and at least one processor operatively connected to the memory, wherein the at least one processor is configured to acquire an image including a specific object, update the object list, based on user purchase history information, collect image data relating to the object, based on the updated object list to update the object image learning data, learn an object classification model, based on the updated object list and the updated object image learning data, and identify the specific object by the learned object classification model.

In accordance with another aspect of the disclosure, a method of operating an electronic device is provided The method includes acquiring an image including a specific object, updating the object list, based on user purchase history information, collecting image data relating to the object, based on the updated object list to update object image learning data, learning an object classification model, based on the updated object list and the updated object image learning data, and identifying the specific object by the learned object classification model.

According to various embodiments, the electronic device can acquire image information on the external object and related information, and improve the recognition rate of the external object, based on the obtained information.

According to various embodiments, the electronic device may acquire related information for external object recognition to add learning data and learn an object classification model to improve image recognition performance for external objects.

According to various embodiments, the electronic device can appropriately limit the range of the object to be compared by acquiring relevant information for external object recognition, based on the location where the external object is located, thereby saving resources and time for external object recognition.

According to various embodiments, the electronic device can recognize the external object quickly and accurately with a small amount of resources, thereby providing various user services associated with the external object immediately.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
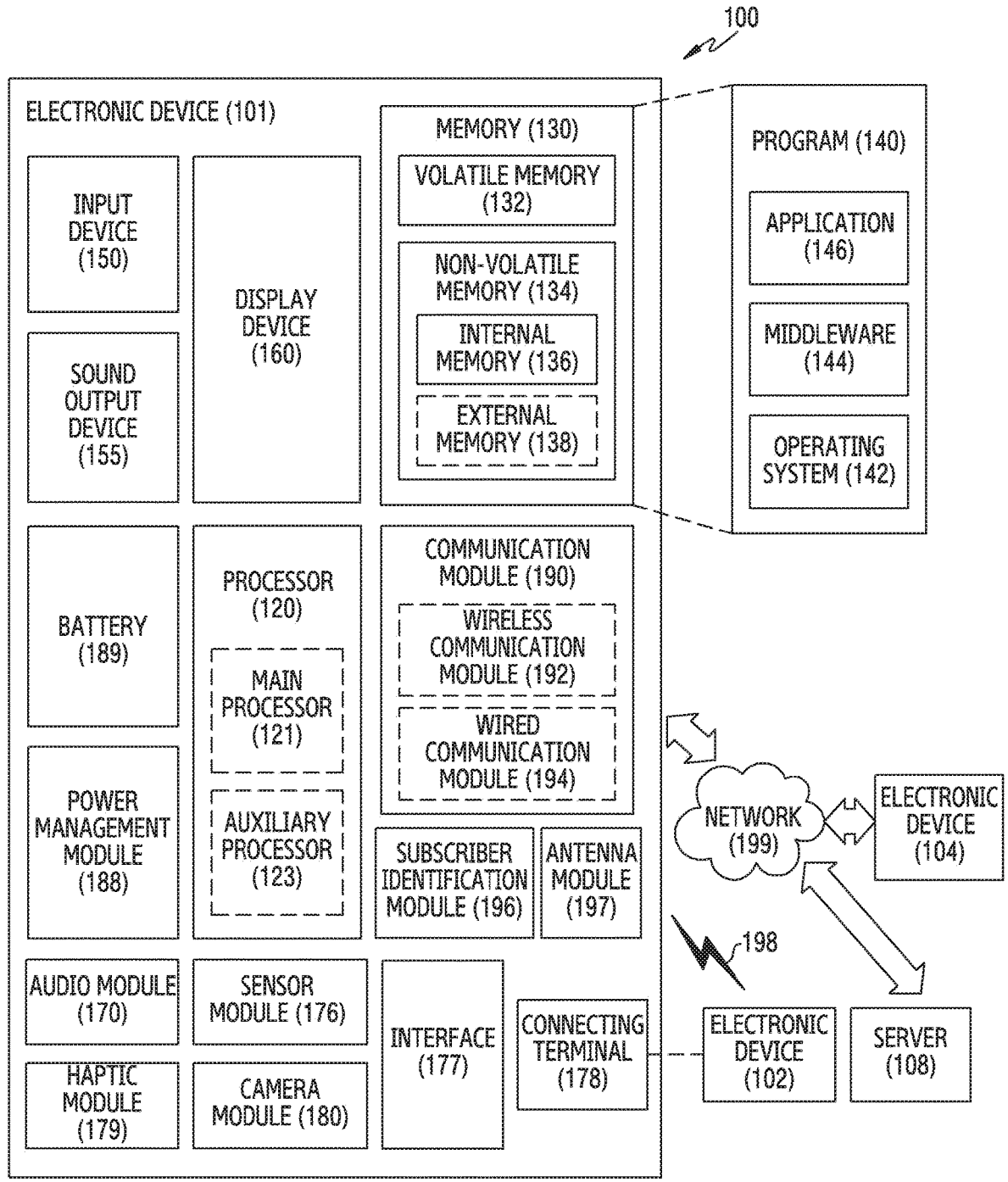
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190 (e.g., a communication circuit or a transceiver), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
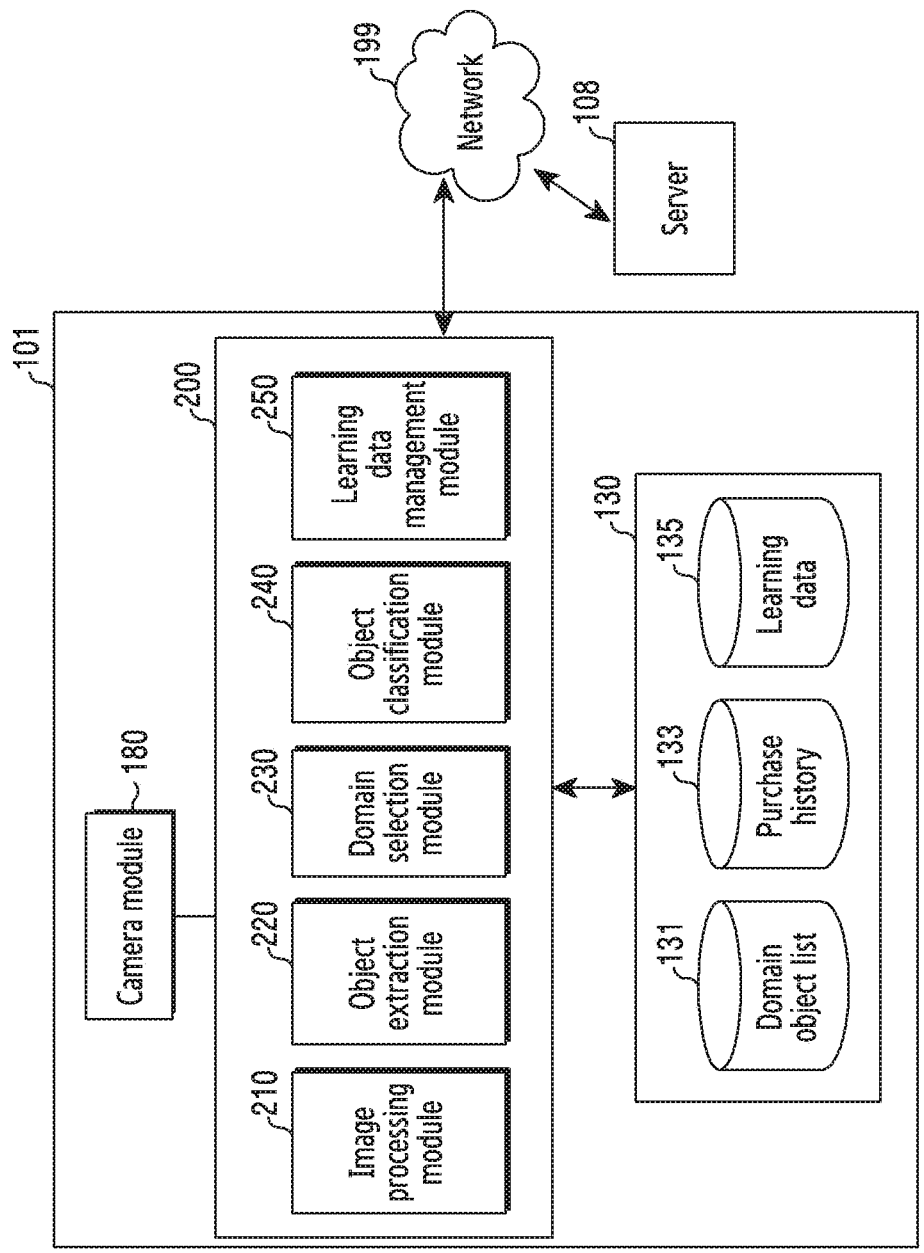
FIG. 2 is a functional block diagram of an electronic device according to an embodiment of the disclosure.

FIG. 2 is a functional block diagram of an electronic device according to an embodiment of the disclosure. The functional configuration of such an electronic device may be included in the electronic device 101 shown in FIG. 1.

Referring to FIG. 2, the electronic device 101 may include a memory 130, a camera module 180, and an object recognition module 200.

According to various embodiments, the object recognition module 200 may represent an example of a function processing module related to identifying an object by processing the acquired image to obtain image information, and extracting an object region based on the image information. In various embodiments, the object recognition module 200 may be included as a hardware module in a processor (e.g., the processor 120 of FIG. 1) including processing circuitry, or as a software module.

According to various embodiments, the memory 130 may store an instruction, a control command code, control data, or related data that controls an object recognition operation of the electronic device 101.

According to various embodiments, the memory 130 may include a domain object list 131, a purchase record (history) 133, and/or learning data 135 as a database.

For example, the domain object list 131 of the memory 130 may include domain information for classifying a plurality of objects, and a list of object names for each of a plurality of object types included in the domain information. The domain information may classify a plurality of objects into different domains, based on various places classified according to various criteria, such as a home or a company. The domain information may be re-classified into a plurality of sub-domains according to various criteria, for example, an object function or a purpose of use, if necessary for some domains. For example, the domain object list 131 may be classified to include subtypes for at least some of the plurality of object types included in the type information. For example, the domain object list 131 may classify detailed places, such as a living room, a room, a kitchen, or a bathroom as a sub-domain of a home domain, for example, for a 'home' item among domains according to a place according to the categorized domain information, and may classify object types, such as electronic devices, furniture, tools, etc., which are included in a sub-domain such as, for example, a kitchen. Refrigerators, microwave ovens, coffee makers, etc. may be included as the electronic device type, and dining tables, chairs, stands, etc. may be included as the furniture type.

For example, the purchase record (history) 133 of the memory 130 may include purchase product information and/or related information on the product according to the purchase history of the actual product for each user. In addition, the purchase record (history) 133 may include an expected purchase product and/or related information on the product according to a user's web search history.

For example, the product information and/or product-related information stored in the purchase record (history) 133 may be acquired from the electronic device 101 or other electronic devices existing in the corresponding space or other electronic devices (e.g., the electronic device 102 or 104 of FIG. 1) used by the user. For example, the product information and/or related information about the product stored in the purchase record (history) 133 may be acquired from an external device including a product search site such as Amazon, Alibaba, or Taobao (e.g., the electronic device 102 or 104 or the server 108 of FIG. 1).

According to various embodiments, the object recognition module 200 may acquire the product information and/or related information about the product whenever the purchase or web search record occurs, for example, from an external device including the product search site.

According to various embodiments, the object recognition module 200 may receive a corresponding purchase through, for example, a push alarm from an external device including the product search site whenever a purchase history occurs and the product information and/or related information about the product.

According to various embodiments, the object recognition module 200 may check, for example, whether a purchase history or a product search occurs every predetermined period (e.g., once every two days), and if so, may obtain the product information and/or related information about the product from an external device including the product search site.

For example, the learning data 135 of the memory 130 may include various image data and related data required to recognize an object, based on the domain object list 131. For example, the learning data 135 may be obtained from the learning data management server 108 and stored in the memory 130. For example, the learning data 135 may include learning data including various information such as an object image for classifying a specific domain such as a place.

For example, the learning data 135 may include type information for each object type belonging to each domain. The type information may be information generated based on a common point of a plurality of objects, which can be classified as a common type. For example, the learning data 135 may include information about a key-point for each object type belonging to each domain. The key-point information may be information obtained through image processing. For example, objects corresponding to each type may correspond to a shape including a common characteristic corner point. The learning data 135 may store information about the characteristic shape of each type as key-point information.

According to various embodiments, the object recognition module 200 may include an image processing module 210, an object extraction module 220, a domain selection module 230, an object classification module 240, and/or a learning data management module 250.

According to various embodiments, the image processing module 210 may process, for example, a raw image including an object obtained from, for example, the camera module 180 or an external device (not shown), and output image information that has been preprocessed to increase image recognition rate such as lens distortion compensation or noise removal.

According to various embodiments, the object extraction module 220 may analyze image information and recognize to extract an object (or object area). For example, the object extraction module 220 may output an area composed of similar feature points from the image information as the object area. For example, the object extraction module 220 may extract feature points for edges, corners, and contours using various recognition algorithms, such as a scalar invariant feature transform (SIFT) algorithm, and a speeded up robust features (SURF) algorithm. This is only an example, and embodiments of the disclosure are not limited thereto, and various known technologies may be referred to in connection with recognizing an object. For example, the object extraction module 220 may recognize an object by generating a point cloud that is a set of points defining an object in a voxel form from signals reflected from the object.

According to various embodiments, the domain selection module 230 may select a domain for object classification and load an object list of the corresponding domain from the domain object list 131 of the memory 130. For example, the domain selection module 230 may select a specific space, such as a home or a company in which the electronic device 101 is located, as a domain for object classification, based on the location identification of the electronic device 101. To this end, the domain selection module 230 may use, for example, identification information of various access providers (APs) such as a wireless fidelity (Wi-Fi) repeater communicating with the electronic device 101, location identification information such as global positioning system (GPS) information for location identification, and various applications for identifying a location, based on various identifiers for location identification. Alternatively or supplementally, the domain selection module 230 may extract other object information or other place-related information capable of identifying a place from the image including the object, and select the domain, based on this.

According to various embodiments, the object classification module 240 may identify an object, based on the learning data 135. For example, the object classification module 240 may output the name of the object corresponding to the object or object area extracted from the object extraction module 220 using the learning data 135, based on the object list included in the domain selected by the domain selection module 230. For example, the object classification module 240 may compare object information, such as image information or feature point information of the object or object region extracted by the object extraction module 220 with data stored in the learning data 135, based on the object list included in the domain selected by the domain selection module 230, search data corresponding to the domain object list, determine data matching the object information, and output an object name corresponding to the data. To this end, for example, the object classification module 240 may calculate a degree of similarity indicating the degree of similarity to the feature point information of the extracted object for each feature point information stored in the learning data 135, and may check at least one feature point information exceeding a reference degree of similarity. To this end, the object classification module 240 may include an artificial intelligence module and/or an advanced image recognition framework (AIR framework). The object classification module 240 may analyze the object area, based on the feature points of the object area as object information, calculate analysis information, and calculate keywords or metadata therefrom.

According to various embodiments, when the object classification module 240 cannot identify an object corresponding to object information exceeding the reference degree of similarity by the analysis and/or matching, the object classification module 240 may update the domain object list 131 through the purchase record (history) 133.

According to various embodiments, the object classification module 240 may update the learning data through the learning data management module 250 according to the update of the domain object list 131.

According to various embodiments, the object classification module 240 may perform the object identifying operation again using the updated learning data, based on the object list of the domain selected using the updated domain object list 131.

According to various embodiments, the object classification module 240 may output information that guides a user's input through an input device (e.g., the input device 150 of FIG. 1), for example, to receive the object name through, for example, a display device (e.g., the display device 160 of FIG. 1), when necessary, such as when the object identification fails.

According to various embodiments, the object classification module 240 may transmit object-related information, such as an object name based on the purchase record (history) 133, to the external server 108, and may update the learning data 135 by downloading updated learning data by adding learning data relating to an object based on the purchase record (history) 133 from the external server 108.

According to various embodiments, the domain selection module 230 or the object classification module 240 may check the purchase record (history) 133 and update the domain object list 131, based on user purchasing activity information including product purchase information and/or product search information according to the purchase history.

According to various embodiments, the learning data management module 250 may acquire object information such as an image of an object corresponding to the purchase record (history) 133 and update the same by adding to the learning data 135, and the object classification module 240 may classify objects, based on the updated domain object list 131 and the updated learning data 135. The object image may include, for example, a high-resolution image for merchandise sales, and may be obtained, for example, through a product search site such as Amazon, Alibaba, or Taobao.

According to various embodiments, the electronic device (e.g., the electronic device 101 of FIGS. 1 and 2) may include a memory (e.g., the memory 130 of FIGS. 1 and 2) storing object list and object image learning data, and a processor (e.g., the processors 120 and/or 200 in FIGS. 1 and 2) operatively connected to the memory.

According to various embodiments, the processor may acquire an image including a specific object, update the object list, based on a user purchase history information, collect image data relating to the object, based on the updated object list to update the object image learning data, learn an object classification model, based on the updated object list and the updated object image learning data, and identify the specific object by the learned object classification model.

According to various embodiments, the processor may acquire the user purchase history information from information generated by purchasing or searching for a specific product.

According to various embodiments, the processor may acquire the user purchase history information from an application for purchasing or searching for a specific product.

According to various embodiments, the electronic device may further include a communication module (e.g., the communication module 190 of FIG. 1) operatively connected to the processor.

According to various embodiments, the processor may acquire the image data through the communication module from a site related to purchase or search of a specific product, based on the user purchase history information.

According to various embodiments, the processor may acquire similar image data of a product similar to the specific product as the image data through the communication module, based on information generated by searching for or purchasing of the specific product.

According to various embodiments, the processor may acquire the object-related management information, based on information generated by searching for or purchasing of the specific product, and provide the object-related management service, based on the object-related management information.

According to various embodiments, the processor may attempt to identify the specific object, based on the object list, update the object list when the attempt fails, primarily learn the object classification model, based on the updated object list, and identify the specific object by the primarily learned object classification model.

According to various embodiments, when the identification of the specific object by the primary learned object classification model fails, the processor may acquire image data relating to the object from an external device through the communication module, based on the user purchase history information, and perform secondary learning on the primary learned object classification model using the updated learning data by adding the acquired image data.

According to various embodiments, the processor may identify the specific object by the secondarily learned object classification model, and when the specific object by the secondarily learned object classification model fails, may acquire information related to the object from a user.

According to various embodiments, the processor may acquire the place information where the specific object is located, and may identify the specific object by limiting the object list based on the place information among the object list.

Figure 3:
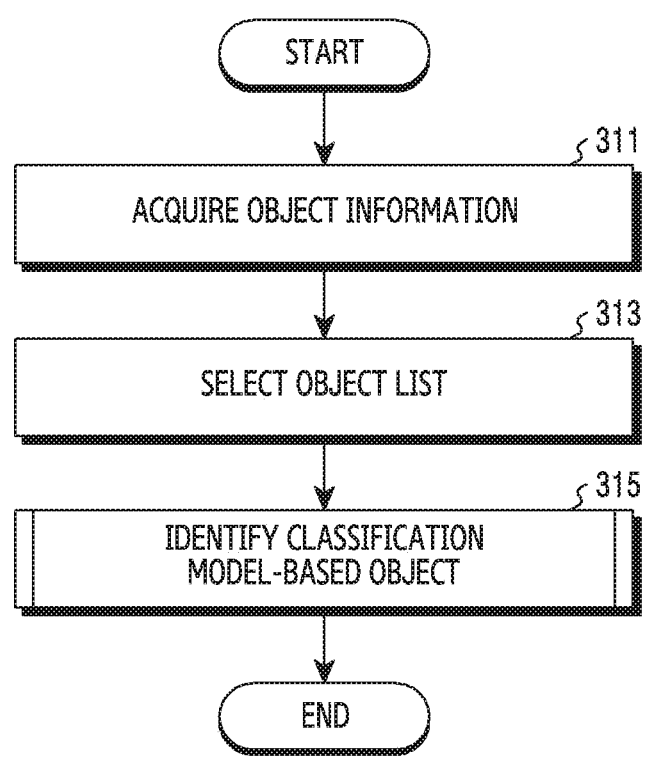
FIG. 3 is a flowchart illustrating an operation for recognizing an external object in an electronic device according to an embodiment of the disclosure.

FIG. 3 is a flowchart illustrating an operation for recognizing an external object in an electronic device according to an embodiment of the disclosure.

According to various embodiments, the operations illustrated in FIG. 3 may be performed by a processor (e.g., the processor 120 of FIG. 1 or the object identification module 200 of FIG. 2, hereinafter referred to as a "processor") of an electronic device (e.g., the electronic device 101 of FIG. 1).

Referring to FIG. 3, according to various embodiments, in operation 311, the processor may acquire object information and object-related information that need to be identified.

For example, the object information may include image information about the object or an image including the object. The object may include a person, object, or background, for example. Also, the object image information may include, for example, image information on an object or object area extracted from image information including the object. The object area may mean, for example, an area composed of a boundary separated from other objects (e.g., a background), based on the position coordinates of the object from an image including the object. The image information including the object may be acquired through, for example, an image sensor (e.g., the camera module 180 of FIG. 1 or 2) or may be received from an external device (e.g., the electronic device 102 or 104 of FIG. 1) connected to the electronic device 101 by wire or wirelessly.

For example, the object-related information may include information on a place where the object is located. The information on the location where the object is located may be one of various predefined locations classified according to various criteria, such as a home or a company. The information on the place where the object is located may include, for example, a specific place as an upper domain and a detailed place for the specific place as a lower domain. The location information may be acquired, for example, by using identification information of various access providers (APs) such as a Wi-Fi repeater communicating with the electronic device 101, location identification information such as global positioning system (GPS) information for location identification, and various applications for identifying a location, based on various identifiers for location identification. The information on the place, alternatively or supplementally, may be identified by extracting other object information or other place-related information that can identify the place from the image containing the object, and based on this, using learning data (e.g., the learning data 135 of FIG. 2) stored in the memory (e.g., the memory 130 of FIG. 1 or FIG. 2).

According to various embodiments, in operation 313, the processor may select an object list for identifying the object, based on the object information and/or object-related information.

For example, the object list may include a list of objects included in a domain related to the object. The object list may include a list of objects included in a domain corresponding to a place where the object is located.

According to various embodiments, the object list included in the domain corresponding to the place where the object is located may be, for example, a pre-configured object list for objects registered in advance for the place.

According to various embodiments, the object list included in the domain corresponding to the place where the object is located may include a list of objects registered in advance in the place through a general object recognition process such as, for example, an environment recognition process. In addition, the object list may further include an object list identified or modified through a request to the user in addition or auxiliary to the general object recognition process at the place.

According to various embodiments, in operation 315, the processor may identify the object corresponding to the object information, based on a classification model. In this case, the object corresponding to the object information may be identified as any one of the selected domain object list(s). The classification model may be a learning model for object recognition learned using the learning data 135 stored in the memory 130. The classification model may be built through learning such as deep learning using the learning data 135 in the electronic device 101. In the classification model, collection of the learning data 135 and object recognition learning may be performed by an external server (e.g., the server 108 of FIG. 1). In this case, the electronic device 101 may receive the learning data 135 and the classification model from the external server 108 and store them in the memory 130.

According to various embodiments, the processor may update the learning data when the above learning data needs to be updated, and update the classification model in response to updating the learning data. For example, when the processor tracks a user's product purchase history or web search history related to a place corresponding to the domain and acquires related information, the processor may extract object information or object-related information, such as product information and/or purchase or search information, from the purchase history or web search record, and add the same to the domain object list. The processor may perform the update of the domain object list every predetermined period or whenever a specific purchase history or web search record occurs.

The processor may update the learning data, based on the updated domain object list and re-learn the classification model accordingly. Accordingly, in operation 315, based on the updated classification model, the processor may output a name of a specific object among objects included in the updated domain object list as an object corresponding to the obtained object information.

According to various embodiments, the scope of the target object for object identification is limited to a list of objects in the selected domain, so that a problem that misidentification of the object or the product itself corresponding to the object occurs in the existing deep learning model, which is caused by applying a universal name without limitation on the object name, can be reduced, and accordingly, the object recognition rate can be increased.

According to various embodiments, the processor may transmit object information and/or object-related information to the external server 108, and the server 108 may identify the object corresponding to the object information, based on the classification model, and send the identified object name to the electronic device 101. In this case, the processor may transmit the object image or the image including the object as object information to the server 108 for analysis. In addition, the processor may transmit information, such as a location where the object is located, to the server 108 as object-related information in addition to the image.

Figure 4:
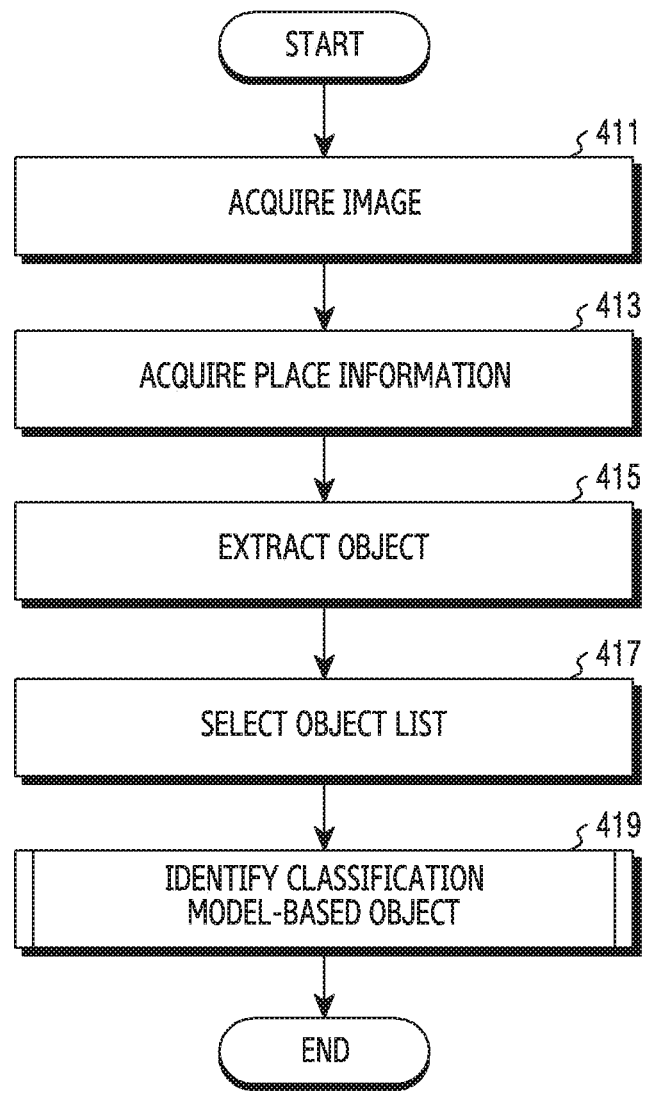
FIG. 4 is another flowchart illustrating an operation for recognizing an external object in an electronic device according to an embodiment of the disclosure.

FIG. 4 is another flowchart illustrating an operation for recognizing an external object in an electronic device according to an embodiment of the disclosure.

According to various embodiments, the operations illustrated in FIG. 4 may be performed by a processor (e.g., the processor 120 of FIG. 1 or the object identification module 200 of FIG. 2, hereinafter referred to as a "processor") of an electronic device (e.g., the electronic device 101 of FIG. 1).

Referring to FIG. 4, according to various embodiments, in operation 411, the processor may acquire an image including an object that need to be identified. The object may include, for example, a person, an object, or a background together.

The image information including the object may be acquired through, for example, an image sensor (e.g., the camera module 180 of FIG. 1) or may be received from an external device (e.g., the electronic device 102 or 104 of FIG. 1) connected to the electronic device 101 by wire or wirelessly.

According to various embodiments, in operation 413, the processor may acquire information on a place where the object is located. The information on a place where the object is located may be one of various predefined locations classified according to various criteria, such as a home or a company. The information on the place may be identified based on the extraction of other object information or other place-related information capable of identifying the place from the image containing the object. For example, the information on a place may be identified according to predetermined reference information such as the existence of a specific furniture (e.g., a bed or sink) or the number of specific furniture (e.g., the number of desks is 4 or more). For example, the information on a place may be identified using learning data stored in the memory (e.g., the learning data 135 of the memory 130 of FIG. 2) for all objects extracted from the image including the object.

According to various embodiments, in operation 415, the processor may extract a target object or an object area from the image including the object. The object area may mean, for example, an area composed of a boundary separated from other objects (e.g., a background), based on the position coordinates of the object from an image including the object.

According to various embodiments, in operation 417, the processor may select an object list for identifying the extracted object, based on the place information.

For example, the selected object list may include a list of objects included in a domain corresponding to a place where the object exists. For example, the object list of the domain corresponding to the place where the object is located may be a list consisting of objects previously registered in a specific place where the object currently exists. For example, the object list of the domain corresponding to the place where the object is located may include a list of objects registered in advance through the general object recognition process such as, for example, the environment recognition process. In addition, the object list of the domain may further include an object list identified or modified through a request for a user in addition to or supplementary to the general object recognition process at the place.

According to various embodiments, in operation 419, the processor may identify an object corresponding to the object information, based on the classification model for object identification. In this case, an object corresponding to the object information may be identified as any one of the selected domain object list(s).

According to various embodiments, the processor may provide the similarity (e.g., 60%, 80%, or 85%) of the object with the identified object name as a result of comparing the learning data with the object information according to the classification model, for example, through a display device (e.g., the display device 160 of FIG. 1). In addition, the processor may induce user feedback on the object specific result and similarity.

The classification model may be a learning model for object recognition learned using the learning data 135 stored in the memory 130. The classification model may be built through learning such as deep learning using the learning data 135 in the electronic device 101. Alternatively, in the classification model, the collection of the learning data 135 and the object recognition learning process may be performed by an external server (e.g., the server 108 of FIG. 1). In this case, the electronic device 101 may receive the learning data 135 and the classification model from the external server 108 and store them in the memory 130.

According to various embodiments, when the object identification corresponding to the object information in the domain object list fails, based on the classification model, the processor may determine that the object does not exist in the domain object list, and update the domain object list by collecting information related to the object in addition to the image including the object. The information on the object may be obtained from, for example, a purchase history of the user (e.g., a resident, an employee, or a registered person) associated with a place corresponding to the domain or a web search record.

Figure 5:
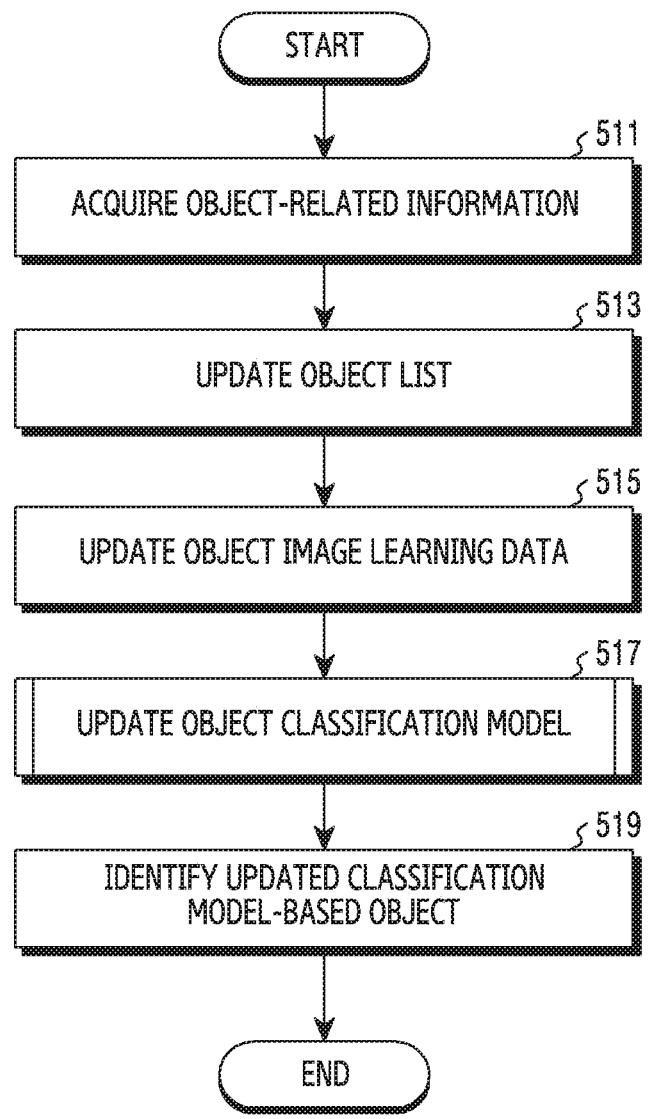
FIG. 5 is a flowchart illustrating an operation for recognizing and identifying an external object in an electronic device according to an embodiment of the disclosure.

FIG. 5 is a flowchart illustrating an operation for recognizing and identifying an external object in an electronic device according to an embodiment of the disclosure.

According to various embodiments, the operations illustrated in FIG. 5 are for describing operation 419 of FIG. 4 in more detail, and may be performed by a processor (e.g., the processor 120 of FIG. 1 or the object identification module 200 of FIG. 2, hereinafter referred to as a "processor") of an electronic device (e.g., the electronic device 101 of FIG. 1).

According to various embodiments, the processor may identify the object according to the image object classification model by using pre-built learning data, based on a location where the object is located or a list of objects classified into a domain in which the object is located, for an image including the object Referring to FIG. 5, according to various embodiments, in operation 511, the processor may acquire object-related information when object identification fails. For example, when the object identification fails, the processor may determine that the domain object list needs to be updated. Accordingly, the processor, for example, for a domain for a place where an object is located, may acquire object information or object-related information from information generated according to a correlation between various objects of users related to the corresponding place, for example, a purchase history for a specific object or a web search record.

For example, when the domain is selected as the "home", object information or object-related information may be acquired based on a purchase history of a first user who is a resident of the home or a web search record. That is, if the first user searched for a coffee maker among the electronic devices through the web search or even purchased a coffee maker, there is a possibility that the corresponding product is newly introduced into the domain "home" and corresponds to the object to be identified at present. Therefore, the processor can increase the recognition rate of the object by adding the corresponding product to the domain object list. The processor may include various product information such as a product name, product type, maker, size, identification, and image of the corresponding product and/or related purchase information such as a search or purchase date from, for example, an electronic device such as a smartphone of a first user.

According to various embodiments, in operation 513, the processor may add an object identified based on the obtained object-related information to the object list of the domain.

In the above example, the processor may add the coffee maker to the object list of the domain.

According to various embodiments, in operation 515, the processor may acquire image information on an object added to an object list of the domain and update the learning data.

According to various embodiments, the processor may acquire high-resolution image information, such as an image for sale of goods or an advertisement image according to the product information, based on the purchase history or search history, and add it as the learning data. The image information for the added object may be obtained, for example, from various sites (e.g., Amazon, Alibaba, or Taobao) that sell the object as a product. In addition, the processor may acquire images according to the product information as well as images of various products corresponding to the same object name, based on the purchase history and add them as the learning data.

In operation 517, the processor may learn and update the object classification model, based on the updated domain object list and the updated learning data.

According to various embodiments, in operation 519, the processor may perform the object identifying operation according to the classification model, based on the updated domain object list and the updated learning data. In this case, the processor may determine that the object is identified in order to identify the object, for example, when an object area extracted from an image including an object is compared using the learning data according to the image object classification model, similarity is greater than or equal to a predefined reference value (e.g., 95% or more). On the other hand, even when the similarity is greater than or equal to the predefined reference value, the processor may determine that object identification has failed, for example, when there is negative feedback depending on feedback from the user. In addition, even when the similarity is less than or equal to a predefined reference value, the processor may determine that object identification is successful when there is positive feedback depending on, for example, feedback by the user.

Figure 6:
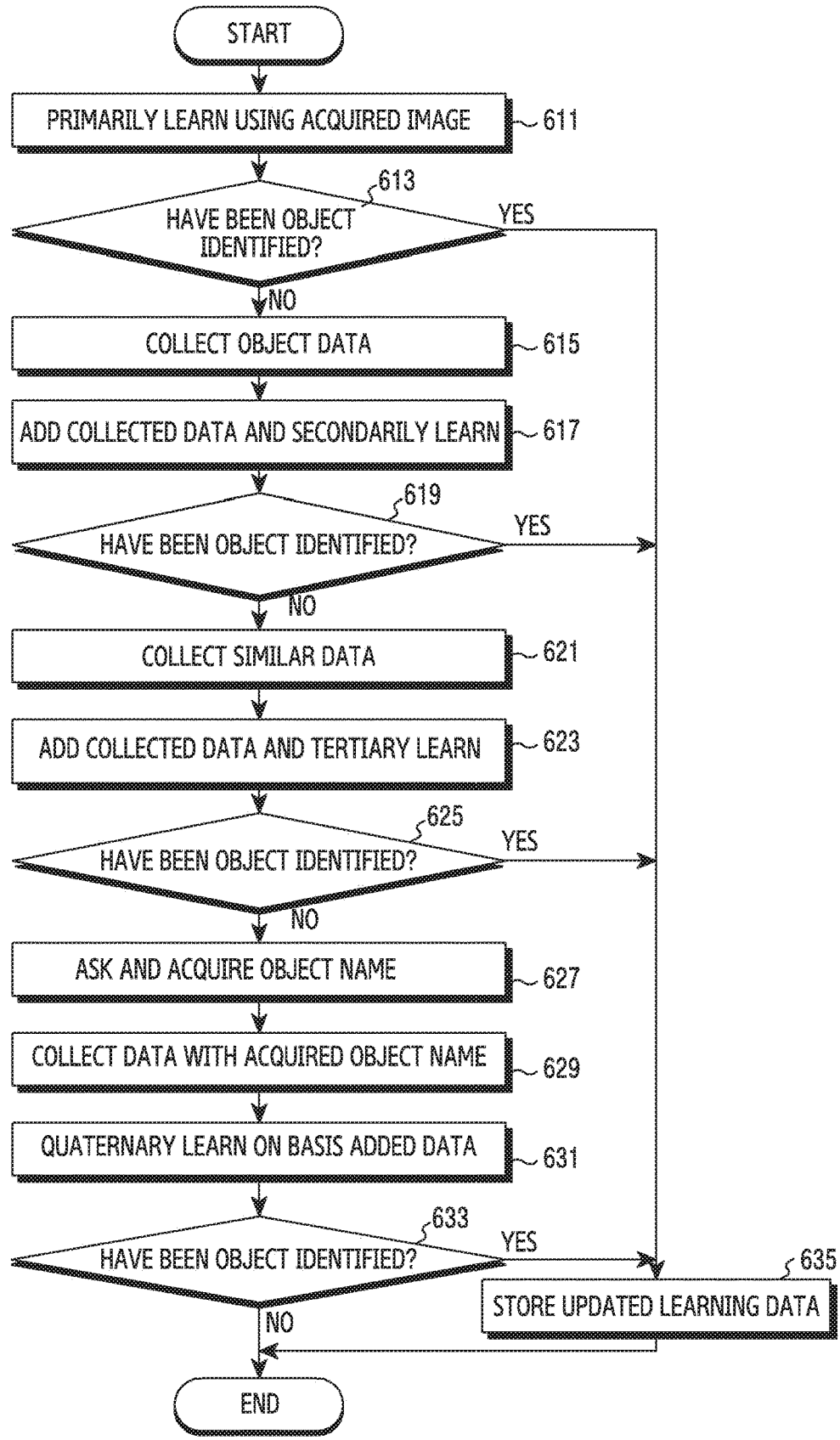
FIG. 6 is a flowchart illustrating an operation of updating an object classification model for recognizing an external object in an electronic device according to an embodiment of the disclosure.

FIG. 6 is a flowchart illustrating an operation of updating an object classification model for recognizing an external object in an electronic device according to an embodiment of the disclosure.

According to various embodiments, the operations illustrated in FIG. 6 are for describing the update operation of an object classification model of FIG. 5 in more detail, and may be performed by a processor (e.g., the processor 120 of FIG. 1 or the object identification module 200 of FIG. 2, hereinafter referred to as a "processor") of an electronic device (e.g., the electronic device 101 of FIG. 1).

Referring to FIG. 6, according to various embodiments, in operation 611, the processor may acquire images of the object, based on the updated object list of the domain, add the same to the learning data, and perform primary learning of the classification model. The images of the object may be acquired by, for example, the electronic device 101 or an external device (e.g., the electronic device 102 or 104 of FIG. 1) locally (e.g., a home network or a wired/wireless LAN) connected by wire/wireless to be received by the electronic device 101.

According to various embodiments, the learning data may be pre-configured to include a sample image capable of discriminating the characteristics of each object in the domain object list, or the pre-configured learning data may be received from the server 108 and stored in the memory (e.g., the memory 130 of FIG. 1 or 2) of the electronic device 101.

According to various embodiments, in operation 613, the processor may determine whether the object is identified. The processor may recognize an object by determining a similarity or a degree of difference between images included in the learning data and determining the most similar image, for example, according to the classification model. When the similarity is smaller than the reference value as a result of the similarity determination, the processor may determine that there is no similar image. The processor may apply a meta learning technique, for example, to increase the image recognition rate.

According to various embodiments, when it is determined that the object is not identified in operation 613, the processor may collect object data for updating the classification model in operation 615.

For example, the processor may extract or receive high-resolution images such as a product selling image and various product information such as a product name and a manufacturer of the object from the purchase or search site, and collect them as object data, according to the object information or object-related information obtained based on the purchase history of the domain, for example, a resident of a home at a specific location or registered users or a web search record. The collected object data may be added to the learning data.

According to various embodiments, in operation 617, the processor may perform secondarily learning on the classification model using the added learning data, based on the updated domain object list.

According to various embodiments, in operation 619, the processor may perform the object identifying operation using the object list of the domain updated by the newly added object, based on the secondarily learned classification model, thereby determining whether the object is identified.

According to various embodiments, when the object identification fails based on the secondarily learned classification model, in operation 621, the processor may collect similar data for updating the classification model.

According to various embodiments, the similar data may include, for example, related images collected through web crawling through keyword-based search using object-related information, such as product information obtained according to the purchase history or web search history of the object. In addition, the processor may generate extended data and add the same as learning data by applying an image processing technique such as rotation, black-and-white, inversion, or tilt, for example, to the additionally obtained similar data.

According to various embodiments, in operation 623, the processor may perform the tertiary learning on the classification model using the learning data to which the collected and/or generated data is added, based on the added domain object list.

According to various embodiments, in operation 625, the processor may perform the object identifying operation using the object list of the domain updated by the newly added object, based on the tertiary learned classification model, thereby determining whether the object is identified.

According to various embodiments, when the identification of the object fails according to the tertiary learned classification model, in operation 627, the processor may acquire the object name by inquiring the user through the electronic device 101.

According to various embodiments, the processor may output a guide requesting the user to input the object name through the display device (e.g., the display device 160 of FIG. 1) of the electronic device 101.

According to various embodiments, in operation 629, the processor may collect object data, based on the acquired object name. The object data may include related images collected through web crawling through keyword-based search using the obtained object name.

According to various embodiments, in operation 631, the processor may add the collected object data as learning data, and perform quaternary learning on the classification model, based on the added learning data.

According to various embodiments, in operation 633, the processor may perform the object identifying operation using the object list of the domain updated by the newly added object, based on the classification model learned in the fourth order, thereby determining whether the object is identified.

According to various embodiments, when it is determined in operation 633 that the object is identified, the processor may store the updated learning data in the memory of the electronic device 101 (e.g., the memory 130 of FIG. 1 or FIG. 2) in operation 635.

Figure 7A:
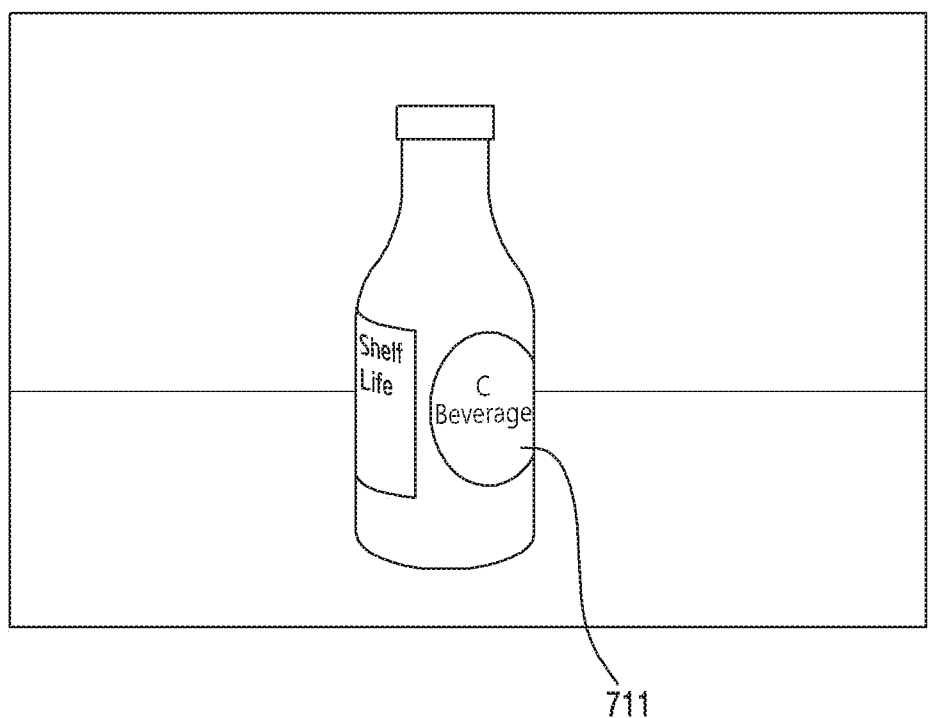
FIG. 7A is a diagram for describing a service providing operation according to external object recognition of an electronic device according to an embodiment of the disclosure.

FIG. 7A is a diagram for describing a service providing operation according to external object recognition of an electronic device according to an embodiment of the disclosure.

Figure 7B:
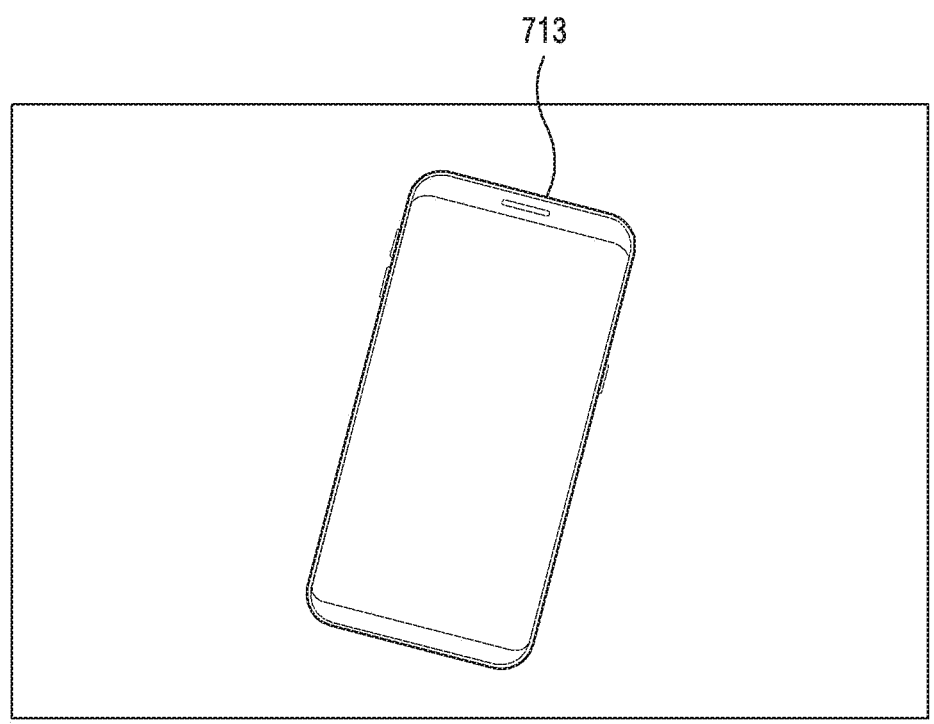
FIG. 7B is a diagram for describing a service providing operation according to external object recognition of an electronic device according to an embodiment of the disclosure.

FIG. 7B is a diagram for describing a service providing operation according to external object recognition of an electronic device according to an embodiment of the disclosure.

Figure 7C:
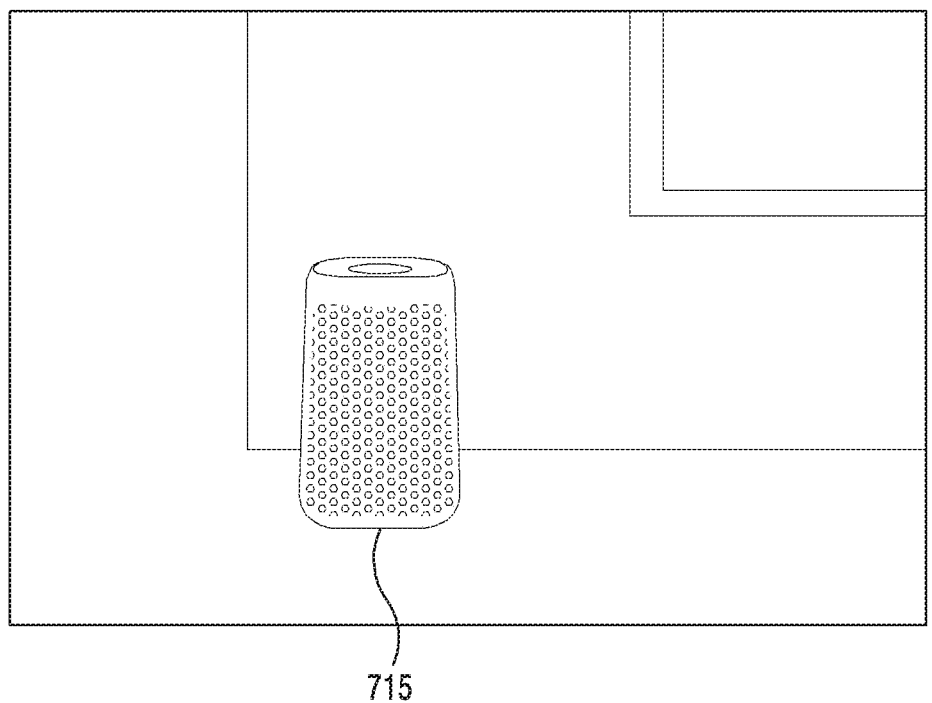
FIG. 7C is a diagram for describing a service providing operation according to external object recognition of an electronic device according to an embodiment of the disclosure.

FIG. 7C is a diagram for describing a service providing operation according to external object recognition of an electronic device according to an embodiment of the disclosure.

The operations illustrated in FIGS. 7A to 7C may be performed by a processor (e.g., the processor 120 of FIG. 1 or the object identification module 200 of FIG. 2, hereinafter referred to as a "processor") of an electronic device (e.g., the electronic device 101 of FIG. 1).

Referring to FIG. 7A, for example, the processor may acquire an image including an object 711 as object information from a camera module (e.g., the camera module 180 of FIG. 1 or FIG. 2) of the electronic device 101 or an external device (e.g., the electronic device 102 or 104 of FIG. 1).

For example, the object image may include various image information about the object. The object information may include, for example, object-related information such as product name (e.g., C beverage) and/or product management information such as shelf life. The object image may also include a background image or a surrounding environment of a place where the object is located, or another object. Meanwhile, the processor may estimate the object name by recognizing, for example, text information from the object or object region extracted from the object image.

According to various embodiments, the processor may extract the object or object area from the object image, and extract feature point information of the object from the object region.

According to various embodiments, the processor may extract information on a location where the object is located from the object image. For example, a place where the object is located may be recognized from the object image, for example, on a refrigerator shelf. In this case, the processor may select the refrigerator as a sub-domain. In addition, the processor may extract information capable of estimating an upper domain, for example, "kitchen" or "home" by analyzing other images acquired before or after the object image is acquired.

According to various embodiments, the processor may acquire a location where the electronic device 101 is located using, for example, identification information of various access providers (APs) such as a Wi-Fi repeater communicating with the electronic device 101, location identification information such as global positioning system (GPS) information for location identification, and various applications for identifying a location, based on various identifiers for location identification.

According to various embodiments, the processor may select a domain for identifying the object, for example, as a home, based on the object information and/or object related information. The processor may select a domain for identifying the object as a "home" as an upper domain and a "refrigerator" as a lower domain.

According to various embodiments, the processor may identify the object according to the classification model using the object image, based on the object list of the domain selected for the object identification.

According to various embodiments, the object list included in the domain may include, for example, a preconfigured object list for objects previously learned or registered for the domain. The object list of the domain may include, for example, an object list recognized and registered in advance through an object recognition process. In addition, the object list of the domain may further include an object list identified or modified through a request for a user registered in the domain. For example, the object list of the domain may include a list of objects such as various beverages, foodstuffs, food containers, etc. in the "refrigerator" as a lower domain with respect to the upper domain "home".

According to various embodiments, when the object cannot be identified based on the domain object list, the processor may track the purchase history or web search records of related persons such as residents or registered users of the domain, acquire product related information, extract object information therefrom, and add the same to the domain object list. The processor may track the purchase history or web search history and acquire product-related information every time a purchase history or web search record of the related person occurs or every predetermined period, even when a case in which the object cannot be identified does not occur. From this, object information can be extracted and added to the domain object list.

According to various embodiments, the processor may update the learning data for identifying the object by obtaining image data and/or object-related information corresponding to the object list added in response to the domain object list update.

The processor may update the learning data, based on the updated domain object list and perform learning on a classification model for identifying the object accordingly. Accordingly, the processor may output a name (e.g., a soft drink) of a specific object among objects included in the updated domain object list as an object corresponding to the obtained object information, based on the updated classification model.

Further, the processor may output object management information corresponding to the output object information. The object management information may include, for example, information such as the manufacturer of the object, a product name, a shelf life, a purchase date, a purchase site, calories, and nutrition information.

According to various embodiments, the processor may provide a service based on the object to a user, based on the object information and/or the object management information. For example, when the expiration date of the object approaches, the processor may provide information on the expiration date of the object to the user through the electronic device 101.

In addition, for example, when the object is provided to the user and consumed, and is no longer recognized in the location of the object, the processor may provide guide information for inquiring the user to reorder the object through the electronic device 101 based on the object information and/or the object management information.

According to various embodiments, the processor may configure a separate domain object list update scenario for, for example, the lower domain "refrigerator" included in the upper domain "home". For example, whenever a new item is introduced into the "refrigerator" and/or is leaked, the processor may separately manages a list of objects for the "refrigerator", acquire object information such as the location where the goods are placed in the "refrigerator", the product type and product name of the product, and object-related information such as purchase date, purchase site, calories, nutrition information, or object management information to update the object list, and provide the above-described service, based thereon.

Referring to FIG. 7B, for example, the processor may acquire an image including the object 713 from the camera module 180 of the electronic device 101 as object information or the external device.

According to various embodiments, the object image may include a specific product image, for example, a smartphone.

According to various embodiments, the processor may extract the object or object area from the object image, and extract feature point information of the object from the object area.

According to various embodiments, the processor may extract information on a location where the object is located from the object image. For example, when another object is located in the background of the object image, information capable of inferring the place where the object is located may be extracted from the other object. In addition, the processor may analyze another image acquired before or after acquiring the object image, and recognize that a place where the object is located, for example, a bedroom, from a part of another object (e.g., a side table) included in the other image. In this case, the processor may select a domain "home" as a domain corresponding to the object, based on the location of the object.

According to various embodiments, the processor may acquire a location where the electronic device 101 is located using, for example, identification information of various access providers (APs) such as a WiFi repeater communicating with the electronic device 101, location identification information such as global positioning system (GPS) information for location identification, and various applications for identifying a location, based on various identifiers for location identification.

According to various embodiments, the processor may load the object list of the domain based on the selected domain "home" and identify the object according to the classification model using the object image.

According to various embodiments, the object list included in the domain may include, for example, objects that can be generally included in the domain, and may be received in advance, for example, from a server (e.g., the server 108 of FIG. 1), with a classification model learned with learning data corresponding thereto, for example, and stored in the memory 130. In addition, the processor may pre-recognize and learn an object for the domain in the domain object list and learning data through an object recognition process in the domain, or update the same through a registration process through a user.

According to various embodiments, when the object is recognized for the first time in the domain, when there is a user's request for any related service, or when a purchase history or search history related to the object occurs, the processor may check the domain object list and update the domain object list by collecting the object related information.

According to various embodiments, for example, the processor may check the purchase history or search history and obtain object-related information such as a purchase product type, a product name, a product manufacturer, a purchase or search date, and a purchase price through various application information such as a web browser, a messenger application, a text message application, and a payment application of the electronic device 101. For example, the processor may check as purchasing or searching for a Galaxy S10 product, a smartphone manufactured by Samsung Electronics on May 3, 2019, through the payment application.

According to various embodiments, the processor may acquire image data and/or product-related information of a related product from the purchase information or search information, and update learning data for identifying the object. To this end, the processor may acquire high resolution images such as images for sale of the product, for example, through the product promotion site of the Samsung Electronics, an online sales site where the Galaxy S10 product is purchased or searched, a site for general product sales such as Amazon, or a general search site such as Google. The processor may update the acquired images by adding them to the learning data, and by learning the classification model.

Further, the processor may collect product-related information related to the product information, based on the product information according to the purchase history. For example, the product-related information may include price information of various sites selling the product, information on a series product of the product, or accessory-related information on the product.

According to various embodiments, the processor may provide a service based on the product or object to a user, based on the product-related information. The processor may provide guidance information to the user when an event such as a series product launch, a discount event, or related accessory launch of the object occurs.

Referring to FIG. 7C, for example, the processor may acquire an image including the object 715 from the camera module 180 of the electronic device 101 or an external device as object information.

According to various embodiments, the object image may include a product image of a specific electronic device, for example, an air purifier.

According to various embodiments, the processor may extract the object or object area from the object image, and extract feature point information of the object from the object region.

According to various embodiments, the processor may extract information on a location where the object is located from the object image. For example, when a part of another object (e.g., a wall-mounted television (TV)) is included in the background of the object image, information (e.g., a living room) capable of inferring the place where the object is located may be extracted from the other object. In this case, the processor may select a "home" domain as a domain, based on the location of the object.

According to various embodiments, the processor may acquire and preselect a location where the electronic device 101 is located using various applications that identify a location based on various identifiers for the above-described location identification.

According to various embodiments, the processor may load the object list of the domain based on the selected domain "home" and identify the object according to the classification model using the object image.

According to various embodiments, when the object is recognized for the first time in the domain, when there is a user's request for any related service related to the object, or when a purchase history or search history related to the object occurs, the processor may check the domain object list and collect the object related information to update the domain object list.

According to various embodiments, for example, the processor may check the purchase history or search history and obtain object-related information such as a purchase product type, a product name, a product manufacturer, a purchase or search date, and a purchase price through various application information such as a web browser, a messenger application, a text message application, and a payment application of the electronic device 101. For example, the processor may check as purchasing or searching for Blue Sky, an air purifier manufactured by Samsung Electronics, on May 8, 2019 through the payment application.

According to various embodiments, the processor may acquire image data and/or product-related information of a related product from the purchase information or search information, and update learning data for identifying the object. To this end, the processor may acquire high resolution images such as images for sale of the product, for example, through the product promotion site of the Samsung Electronics, an online sales site where the Blue Sky air purifier product is purchased or searched, a site for general product sales such as Amazon, or a general search site such as Google. The processor may update the acquired images by adding them to the learning data, and by learning the classification model.

Further, the processor may collect product-related information related to the product information based on the product information according to the purchase history or search history. For example, the product-related information may include various information such as price information of various sites selling the product or replacement cycles or price information about replacement parts such as filters of the product.

According to various embodiments, the processor may provide a service, based on the product or object to a user based on the product related information. The processor may provide the user with various management information such as A/S expiration date of the object, filter replacement time, price for filter purchase, and/or sales site information.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. An electronic device comprising:
   a memory configured to store an object list, object image learning data used to identify an object in an image, and user purchase history information comprising product-related information on products according to at least one purchase history of at least one user; and
   at least one processor operatively connected to the memory,
   wherein the at least one processor is configured to:
      acquire an image including a specific object,
      update the object list by adding at least one object to the object list, wherein the at least one object is identified based on the user purchase history information,
      collect image information on the specific object, based on the updated object list,
      update the object image learning data,
      learn an object classification model, based on the updated object list and the updated object image learning data, and
      identify the specific object by the learned object classification model.

2. The electronic device of claim 1, wherein the at least one processor is further configured to acquire the user purchase history information from product-related information generated by purchasing or searching for a specific product.

3. The electronic device of claim 1, wherein the at least one processor is further configured to acquire the user purchase history information from an application for purchasing or searching for a specific product.

4. The electronic device of claim 1, further comprising:
   a communication circuit operatively connected to the at least one processor,
   wherein the at least one processor is further configured to acquire image data through the communication circuit from a site related to purchasing or searching for a specific product based on the user purchase history information.

5. The electronic device of claim 4, wherein the at least one processor is further configured to acquire similar image data of a product similar to the specific product as the image data through the communication circuit, based on information generated by searching for or purchasing of the specific product.

6. The electronic device of claim 4, wherein the at least one processor is further configured to:
   acquire object-related management information, based on information generated by searching for or purchasing of the specific product, and
   provide object-related management service, based on the object-related management information.

7. The electronic device of claim 1, wherein the at least one processor is further configured to:
   attempt to identify the specific object, based on the object list,
   update the object list based on the attempt failing, primarily learn the object classification model, based on the updated object list, and identify the specific object by the primarily learned object classification model.

8. The electronic device of claim 7, further comprising:

a communication circuit operatively connected to the at least one processor, wherein based on the identification of the specific object by the primarily learned object classification model failing, the at least one processor is further configured to:

acquire image data relating to the specific object from an external device through the communication circuit, based on the user purchase history information, and perform secondarily learning on the primary learned object classification model using the updated object image learning data by adding the acquired image data.

9. The electronic device of claim 8, wherein the at least one processor is further configured to:

identify the specific object by a secondarily learned object classification model, and based on the identification of the specific object by the secondarily learned object classification model failing, obtain information related to the specific object from a user.

10. The electronic device of claim 1, wherein the at least one processor is further configured to:

acquire place information where the specific object is located, and identify the specific object in the object list by limiting to the object list based on the place information.

11. A method of operating an electronic device, the method comprising:

acquiring an image including a specific object;

updating an object list by adding at least one object to the object list, the at least one object being identified based on user purchase history information, wherein the user purchase history information comprises product-related information on products according to at least one purchase history of at least one user;

collecting image information on the specific object, based on the updated object list;

updating object image learning data, wherein the object image learning data is used to identify an object in an image;

learning an object classification model, based on the updated object list and the updated object image learning data; and identifying the specific object by the learned object classification model.

12. The method of claim 11, wherein the user purchase history information is acquired from information generated by purchasing or searching for a specific product.

13. The method of claim 11, wherein the user purchase history information is acquired from an application for purchasing or searching for a specific product.

14. The method of claim 11, wherein image data is acquired from a site related to purchasing or searching for a specific product, based on the user purchase history information.

15. The method of claim 14, wherein the image data includes similar image data of a product similar to the specific product acquired based on information generated by searching for or purchasing of the specific product.

16. The method of claim 14, further comprising:

acquiring object-related management information based on information generated by searching for or purchasing of the specific product; and providing object-related management service, based on the object-related management information.

17. The method of claim 11, further comprising:

attempting to identify the specific object, based on the object list, wherein the updating the object list is performed based on the attempt failing, wherein the learning of the object classification model comprises primarily learning the object classification model, based on the updated object list, and wherein the identifying of the specific object further comprises identifying the specific object by a primarily learned object classification model.

18. The method of claim 17, further comprising:

acquiring image data relating to the specific object from an external device through a communication circuit, based on the user purchase history information, and based on the identification of the specific object by the primary learned object classification model failing, wherein the learning of the object classification model further comprises performing secondarily learning on the primary learned object classification model using the updated object image learning data by adding the acquired image data.

19. The method of claim 18, wherein the identifying of the specific object comprises identifying the specific object by the a secondarily learned object classification model, and wherein based on the identification of the specific object by the secondarily learned object classification model failing, the method further comprising:

obtaining information related to the specific object from a user.

20. The method of claim 11, further comprising:

acquiring place information where the specific object is located, wherein the specific object in the object list is identified by limiting the object list based on the place information.

* * * * *